United States Patent [19]

Ide

[11] 4,332,759
[45] Jun. 1, 1982

[54] PROCESS FOR EXTRUDING LIQUID CRYSTAL POLYMER

[75] Inventor: Yoshiaki Ide, North Plainfield, N.J.

[73] Assignee: Celanese Corporation, New York, N.Y.

[21] Appl. No.: 169,013

[22] Filed: Jul. 15, 1980

[51] Int. Cl.³ .............................................. B29D 3/02
[52] U.S. Cl. ............................... 264/108; 264/176 R; 264/205; 528/176; 528/272; 528/310
[58] Field of Search ........................ 425/198, 199, 205; 264/176 R, 176 F, 108, 205; 528/176, 272, 310

[56] References Cited

U.S. PATENT DOCUMENTS

| | | | |
|---|---|---|---|
| 2,838,011 | 6/1958 | Braibanti et al. | 425/198 |
| 2,892,675 | 6/1959 | Bradshaw | 425/198 |
| 2,923,972 | 2/1960 | DeGhetto | 425/199 |
| 3,856,277 | 12/1974 | Tiramani | 425/197 |
| 4,015,924 | 4/1977 | LaNieve | 425/464 |
| 4,130,545 | 12/1978 | Calundann | 260/40 P |
| 4,160,755 | 7/1979 | Choe et al. | 264/205 |
| 4,183,895 | 1/1980 | Luise | 264/176 F |
| 4,247,514 | 1/1981 | Luise | 264/235 |

*Primary Examiner*—Jay H. Woo
*Attorney, Agent, or Firm*—Charles B. Barris

[57] ABSTRACT

The present invention provides an improved process for extruding liquid crystal polymer. The process comprises the steps of providing a fluid stream of liquid crystal polymer wherein the stream has a flow pattern comprising substantial shear flow; converting the flow of the fluid stream of liquid crystal polymer to a substantially elongational flow in the substantial absence of shear flow; and extruding the fluid stream of liquid crystal polymer to form a shaped article having the polymer molecules oriented substantially parallel to the flow direction. The resulting articles are self-reinforcing, having mechanical properties superior to conventional extruded liquid crystal polymer articles and comparable to those of articles formed from fiber-reinforced isotropic polymeric materials. In a preferred embodiment, the flow of the fluid stream of liquid crystal polymer is converted to a substantially elongational flow by passing the fluid stream of liquid crystal polymer through at least one grid having a plurality of converging passages (e.g., cone-shaped or trumpet-shaped holes).

63 Claims, 1 Drawing Figure

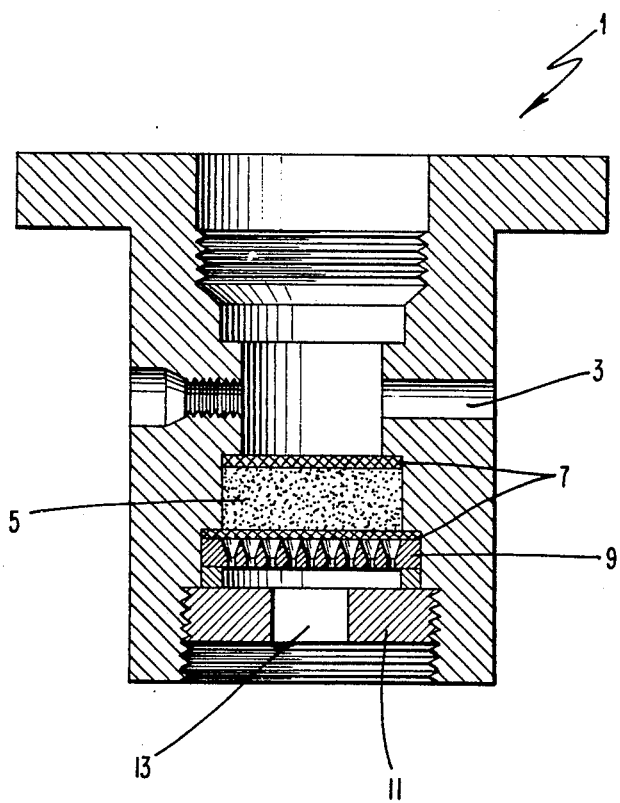

PROCESS FOR EXTRUDING LIQUID CRYSTAL POLYMER

BACKGROUND OF THE INVENTION

The present invention provides an improved process for the extrusion of liquid crystal polymers. The process produces shaped articles having enhanced mechanical properties.

Liquid crystal polymers are well-known in the art. These polymers exhibit anisotropy in the liquid phase. They may be characterized as thermotropic (i.e., liquid crystal in the melt) or lyotropic (i.e., liquid crystal in solution). Liquid crystal polymers have very stiff, rod-like molecules. In the quiescent state, the molecules line up in an ordered array in local regions, thereby forming domains. The individual domains, however, are not lined up into any particular ordered array; instead, they exhibit random orientations.

In contrast, the shaped articles which are produced by the process of the present invention exhibit enhanced mechanical properties due to the orientation of the polymer molecules parallel to the flow direction. Articles, such as films, rods, pipes, fibers, and molded articles, having the molecules oriented in such a manner are self-reinforcing, and have mechanical properties comparable to those of articles formed from fiber-reinforced isotropic polymeric materials.

According to the process of the present invention, articles having improved properties due to orientation of the polymer molecules can be formed by converting the flow of liquid crystal polymer to a substantially elongational flow, in the substantial absence of shear flow, prior to the extrusion of the polymer through a die or other extrusion orifice.

Shear flow is flow in which there is a velocity gradient transverse to the flow direction. Liquid crystal polymer domains can rotate under shear flow, thereby achieving little, if any, orientation.

Elongational flow is flow in which there is a velocity gradient parallel to the flow direction. Elongational flow can be envisioned as a stretching motion. Elongational flow can be utilized to achieve an orientation of the polymer molecules in shaped articles formed from liquid crystal polymers.

It is known in the art to provide breaker plates upstream of the extrusion orifice in extrusion apparatus. Breaker plates are commonly utilized for the purpose of preventing pressure fluctuations in the stream of fluid material in the extrusion apparatus. The cylindrical holes commonly employed in breaker plates give rise to an uncontrolled flow pattern which contains a substantial shear flow component.

Filter packs and other filter media perform the function of removing particles having a relatively large diameter from the stream of fluid material in an extrusion apparatus. Filter media produce a complex flow pattern which, again, includes a substantial shear flow component.

It is also known to those skilled in the art that the birefringence of fibers spun from liquid crystal polymers can be increased by mechanical drawing during spinning. For example, "Flow Birefringence of Polymer Liquid Crystals," *Annual Report of The Research Institute for Chemical Fibers, Japan,* Vol. 35, October, 1978, by Masao Horio, discloses that fibers spun from polyparapheneneterephthalamide, which is a lyotropic liquid crystal polymer, exhibit strong birefringence only when mechanically drawn in the spinline. For many types of shaped articles, such as sheet, films, and three-dimensional articles, however, mechanical drawing of the liquid can not readily be employed to improve the physical properties thereof. Moreover, conventional processes for extruding such articles from liquid crystal polymers, involving conditions of substantial shear flow, do not increase the birefringence of the liquid crystal polymer. Horio in fact observed no birefringence during extrusion of polyparaphenyleneterephthalamide through a glass capillary.

Therefore, it is an object of the present invention to provide an improved process for extruding liquid crystal polymer to form shaped articles which exhibit enhanced mechanical properties.

It is also an object of the present invention to provide an improved process for extruding liquid crystal polymer to form shaped articles having the polymer molecules oriented substantially parallel to the flow direction which exhibit enhanced mechanical properties.

It is also an object of the present invention to provide an improved process for extruding liquid crystal polymer to form shaped articles having the polymer molecules oriented substantially parallel to the flow direction which exhibit enhanced mechanical properties wherein the flow of liquid crystal polymer is converted to a substantially elongational flow in the substantial absence of shear flow prior to extrusion through an extrusion orifice.

It is also an object of the present invention to provide an improved process for extruding liquid crystal polymer to form shaped articles having the polymer molecules oriented substantially parallel to the flow direction which exhibit enhanced mechanical properties wherein the flow of liquid crystal polymer is converted to a substantially elongational flow in the substantial absence of shear flow prior to extrusion through an extrusion orifice by passing said fluid stream of liquid crystal polymer through at least one grid having a plurality of converging passages.

SUMMARY OF THE INVENTION

The present invention provides an improved process for extruding liquid crystal polymer to form shaped articles. The process comprises the steps of providing a fluid stream of liquid crystal polymer wherein the stream has a flow pattern comprising substantial shear flow; converting the flow of the fluid stream of liquid crystal polymer to a substantially elongational flow in the substantial absence of shear flow; and extruding the fluid stream of liquid crystal polymer to form a shaped article having the polymer molecules oriented substantially parallel to the flow direction and exhibiting enhanced mechanical properties.

DESCRIPTION OF THE DRAWING

The drawing is a schematic representation of one embodiment of extrusion apparatus which is suitable for use in the process of the present invention, as described in Example 1, illustrating an elongational grid and its placement within the apparatus.

DETAILED DESCRIPTION OF THE INVENTION

The process provided by the present invention relates to the extrusion of liquid crystal polymer. The liquid crystal polymers have very stiff, rod-like molecules.

The stiffness of the molecules can be characterized by the Mark-Houwink-Sakurada relationship $$[\eta] = KM^\alpha \quad (1)$$

where $[\eta]$ is the intrinsic viscosity, M is the molecular weight, and K and $\alpha$ are constants. The exponent $\alpha$ can characterize the stiffness of the molecules. The liquid crystal polymers commonly exhibit a value of $\alpha$ greater than 1.0 and less than 2.0, whereas isotropic, randomly coiled polymers commonly exhibit a value of $\alpha$ between 0.5 and 1.0. The liquid crystal polymers which are suitable for use in the process of the present invention may be either lyotropic or thermotropic liquid crystal polymers.

Lyotropic liquid crystal polymers are polymers which are liquid crystalline in solution. Lyotropic polymers include wholly aromatic polyamides, aromatic-aliphatic polyamides, aromatic polyamide-hydrazides, polybenzobisoxazoles, and polybenzobisthiazoles. The aromatic polyamides are considered to be "wholly" aromatic in the sense that each moiety present in the polyamide contributes at least one aromatic ring to the polymer backbone.

Specific examples of wholly aromatic polyamides include polyparabenzamide and polyparaphenyleneterephthalamide. Polyparabenzamide and processes of preparing the same are disclosed in U.S. Pat. Nos. 3,109,836; 3,225,011; 3,541,056; 3,542,719; 3,547,895; 3,558,571; 3,575,933; 3,600,350; 3,671,542; 3,699,085; 3,753,957; and 4,025,494. Polyparaphenyleneterephthalamide, which is available commercially under the trademark Kevlar ®, and processes of preparing the same are disclosed in U.S. Pat. Nos. 3,006,899; 3,063,966; 3,094,511; 3,232,910; 3,414,645; 3,673,143; 3,748,299; 3,836,498; and 3,827,998, among others. All of the above-cited U.S. patents are herein incorporated by reference in their entirety. Other wholly aromatic polyamides are poly[2,7-(phenanthridone)terephthalamide], poly(paraphenylene-2,6-naphthalamide), poly[(methyl-1,4-phenylene)terephthalamide], and poly[(chloro-1,4-phenylene)terephthalamide]. Additional specific examples of wholly aromatic polyamides are disclosed by P. W. Morgan in *Macromolecules*, Vol. 10, No. 6, pp. 1381-90 (1977), which is herein incorporated by reference in its entirety.

The above-cited reference also discloses examples of aromatic-aliphatic polyamides, such as poly(paraphenylene-1,4-trans-cyclohexyleneamide) and poly[(trans-1,4-cyclohexylene)terephthalamide].

Aromatic polyamide-hydrazides are disclosed by P. W. Morgan in *A.C.S. Polymer Preprints*, Vol. 18, No. 1, pp. 131-6 (1977), which is herein incorporated by reference in its entirety. Among such polymers can be listed poly(oxalylchloroterephthaloyldihydrazide) and poly(paraphenylene-1,3,4-oxadiazole-co-paraphenyleneterephthalamide).

An example of a polybenzobisoxazole is poly([benzo(1,2-d:5,4-d')bisoxazole-2,6-diyl]-1,4-phenylene); an example of a polybenzobisthiazole is poly(benzo(1,2-d:4,5-d')bisthiazole-2,6-diyl]-1,4-phenylene). These polymers are disclosed in *A.C.S. Polymer Preprints*, Vol. 19, No. 2, pp. 1-6 (1978), which is herein incorporated by reference in its entirety.

The lyotropic polymers described above are liquid crystalline when dissolved in a compatible solvent such as selected amides and ureas, including N,N-dimethylacetamide, N,N-dimethylpropionamide, N,N-dimethylbutyramide, N,N-dimethylisobutyramide, N,N-dimethylmethoxyacetamide, N,N-diethylacetamide, N-methylpyrrolidone-2, N-methylpiperidone-2, N-methylcaprolactam, N-ethylpyrrolidone-2, N-acetylpyrrolidone, N-acetylpiperidine, N,N'-dimethylethyleneurea, N,N'-dimethylpropyleneurea, hexamethylphosphoramide and N,N,N',N'-tetramethylurea; organophosphorus compounds, including N,N-dimethyldimethylphosphinamide, N,N,N',N'-tetramethylmethylphosphondiamide, N,N,N',N'-tetramethylethylphosphondiamide, N,N,N',N'-tetraethylmethylphosphondiamide, triethylphosphine oxide, triisopropylphosphine oxide, 1,3-dimethyl-1-phospha-3-cyclopentene-1-oxide, 1-ethyl-3-methyl-1-phospha-3-cyclopentene-1-oxide, and 1-methyl-1-phosphacyclopentane-1-oxide; concentrated sulfuric acid whose concentration is greater than about 90 percent by weight, usually approximately 98-100 percent by weight $H_2SO_4$ or oleum (i.e., concentrated sulfuric acid containing up to 20 percent or higher of free $SO_3$) which may contain additives (e.g., $NaH_2PO_4$, $Na_2SO_4$, or potassium acetate) which may be present in the amount of 2-3 percent by weight of the total solution; hydrofluoric acid, used alone or in combination with additives such as water (1-2 percent by weight, of the total solution), NaF or KF (1-2 percent by weight of the total solution), an inert chlorinated hydrocarbon (e.g., $CH_2Cl_2$) or mixtures thereof (in an amount up to 5 percent by weight of the total solution); and chloro-, fluoro or methane-sulfonic acids used alone or in combination with additives such as lithium chloride (up to about 2.5 percent by weight).

Mixtures of two or more of the above solvents may be used in suitable combinations, e.g., any of the amides and ureas; hydrofluoric acid and fluoro-sulfonic acid; methane-sulfonic acid and sulfuric acid; oleum and chloro-, fluoro- or methane-sulfonic acid; and the like.

The lyotropic polymer may be dissolved in the solvent in a concentration of approximately 1 to 30 percent by weight.

The use of additives is preferred in many of the solutions. It is believed that particular additives aid the solvation of the polyamide in the solvent. For the amide and urea media, it is highly desirable that at least about 2.0 weight percent of lithium chloride and/or calcium chloride be added to provide a reasonably concentrated solution from particular isolated polymers, e.g., polyparabenzamide. In the preparation of an amide or urea solution, the salt may be conveniently added to the polymer and/or solvent. Salt in excess of about 20 weight percent is generally neither necessary nor desired; less than about 15 weight percent is preferred, about 4 to 8 weight percent being most preferred.

Thermotropic liquid crystal polymers are polymers which are liquid crystalline (i.e., anisotropic) in the melt phase. Thermotropic liquid crystal polymers include wholly aromatic polyesters, aromatic-aliphatic polyesters, aromatic polyazomethines, and aromatic polyester-carbonates. The aromatic polyesters are considered to be "wholly" aromatic in the sense that each moiety present in the polyester contributes at least one aromatic ring to the polymer backbone.

Specific examples of suitable aromatic-aliphatic polyesters are copolymers of polyethylene terephthalate and hydroxybenzoic acid as disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymer can be found in "Liquid Crystal Polymers: I. Preparation and Properties of p-Hydroxybenzoic Acid Copolymers," *Journal of Polymer Science, Polymer Chemistry Edition,* Vol. 14, pp. 2043–58 (1976), by W. J. Jackson, Jr. and H. F. Kuhfuss. The above-cited references are herein incorporated by reference in their entirety.

Aromatic polyazomethines and processes of preparing the same are disclosed in the U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrilo-2-methyl-1,4-phenylene-nitrilomethylidyne-1,4-phenylenemethylidyne); and poly(nitrilo-2-chloro-1,4-phenylenenitrilomethylidyne-1,4-phenylene-methylidyne).

Aromatic polyester-carbonates are disclosed in U.S. Pat. No. 4,107,143, which is herein incorporated by reference in its entirety. Examples of such polymers include those consisting essentially of hydroxybenzoic acid units, hydroquinone units, carbonate units, and aromatic carboxylic acid units.

The liquid crystal polymers which are preferred for use in the process of the present invention are the thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; and 4,188,476; and (f) U.K. Application No. 2,002,404.

Wholly aromatic polyesters which are preferred for use in the present invention are disclosed in commonly-assigned U.S. Pat. Nos. 4,067,852; 4,083,829; 4,130,545; 4,161,470; and 4,184,996; and in commonly-assigned U.S. Application Ser. Nos. 10,392, filed Feb. 8, 1979 (now U.S. Pat. No. 4,238,599); 10,393, filed Feb. 8, 1979 (now U.S. Pat. No. 4,238,598); 17,007, filed Mar. 2, 1979 (now U.S. Pat. No. 4,230,817); 21,050, filed Mar. 16, 1979 (now U.S. Pat. No. 4,224,433); 32,086, filed Apr. 23, 1979 (now U.S. Pat. No. 4,219,461); and 54,049, filed July 2, 1979 (now U.S. Pat. No. 4,256,624). The disclosures of all of the above-identified commonly-assigned U.S. patents and applications are herein incorporated by reference in their entirety. The wholly aromatic polyesters disclosed therein typically are capable of forming an anisotropic melt phase at a temperature below approximately 350° C.

The wholly aromatic polyesters which are suitable for use in the process of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters which are preferred for use in the present invention commonly exhibit a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

Especially preferred wholly aromatic polyesters are those which are disclosed in above-noted U.S. Pat. Nos. 4,161,470 and 4,184,996 and in U.S. application Ser. No. 10,392, filed Feb. 8, 1979 (now U.S. Pat. No. 4,238,599).

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is 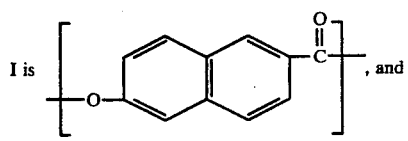 , and

II is 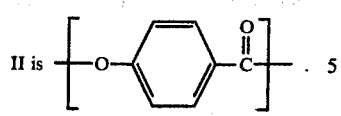 .

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II, and III wherein:

I is 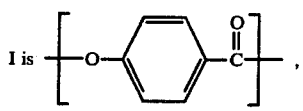 ,

II is 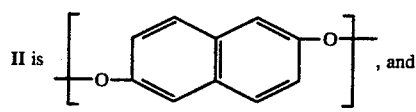 , and

III is 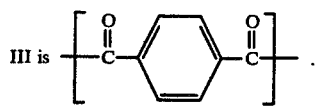 .

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III.

The wholly aromatic polyester which is disclosed in U.S. application Ser. No. 10,392, now U.S. Pat. No. 4,238,599 is a melt processable polyester capable of forming an anisotropic melt phase at a temperature no higher than approximately 320° C. consisting essentially of the recurring moieties I, II, III, and IV wherein:

I is 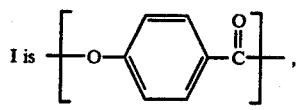 ,

II is 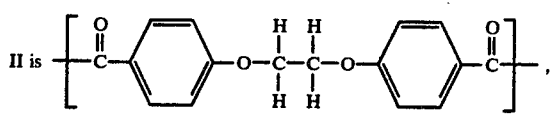 ,

III is 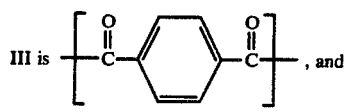 , and

IV is 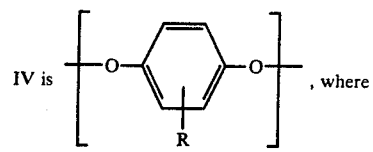 , where

R is methyl, chloro, bromo, or mixtures thereof, and is substituted for a hydrogen atom present upon the aromatic ring,
and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. This wholly aromatic polyester commonly exhibits an inherent viscosity of at least 2.0 dl./g., e.g., 2.0 to 10.0 dl./g., when dissolved in a concentration of 0.3 weight/volume percent in pentafluorophenol at 60° C.

According to the process of the present invention, a fluid stream of liquid crystal polymer is provided to any conventional extrusion apparatus. When the liquid crystal polymer is a lyotropic polymer, the fluid stream will be in the form of a liquid crystal polymer solution; when the liquid crystal polymer is a thermotropic polymer, the fluid stream will be in the form of a liquid crystal polymer melt. Whether the polymer is lyotropic or thermotropic, the fluid stream of liquid crystal polymer within the extrusion apparatus will commonly exhibit a flow pattern having a substantial shear flow component.

The particular apparatus used is not critical to the operation of the process of the present invention, and any suitable apparatus may be used herein. One such apparatus which has been found to be suitable for use with thermotropic liquid crystal polymers employs a contact melting method so that melt residence time can be kept short and constant. The apparatus includes a heated surface against which a molded rod of liquid crystal polymer is pressed. The fluid stream of molten polymer is then introduced to the extrusion chamber inside of which are disposed a filter pack and, in a preferred embodiment, an elongational grid which will be described in greater detail hereinafter. After being passed through the grid, the polymer melt is extruded through an appropriate extrusion orifice (e.g., slit die, spinneret, etc.). Examples of other suitable extrusion apparatus are described in *Plastics Engineering Handbook of the Society of the Plastics Industry, Inc.*, Fourth Edition, edited by Joel Frados, Van Nostrand Reinhold Company (1976), pp. 156–203.

After the fluid stream of liquid crystal polymer has been supplied to the extrusion apparatus, the flow of the fluid stream of liquid crystal polymer is then converted to a substantially elongational flow in the substantial absence of shear flow. As discussed earlier, elongational flow is flow in which there is a velocity gradient parallel to the flow direction, whereas shear flow is flow in which there is a velocity gradient transverse to the flow direction. The flow of the fluid stream of liquid crystal polmer can be converted to elongational flow by converging and drawing the fluid stream of liquid crystal polymer. Preferably, this is accomplished by passing the fluid stream of liquid crystal polymer through at least one grid having a plurality of converging passages. The converging passages have an exit diameter of approximately 20 to 1,000 microns, and preferably of approximately 75 to 150 microns (e.g., approximately 100 microns).

Such a grid contains at least two converging passages (or holes). However, better elongational flow is achieved as the number of holes in the grid increases. Thus, it is preferred that the elongational grid contain approximately 100 to 10,000 holes per square inch. As described in Example 1, applicant has obtained excellent results employing a grid containing 43 holes in a 5/16 inch diameter circular plate (561 holes per square inch), although excellent results can also be obtained employing grids having both a larger and smaller number of holes.

In a preferred embodiment, the converging passages are cone-shaped holes. The cone-shaped holes may have a half-angle within the range of approximately 10° to 60°, e.g., approximately 20° to 45°. The converging passages may also have curved sides, thereby forming trumpet-shaped holes.

Where a very large degree of elongational flow is desired, a plurality of grids disposed in series in the flowpath of the fluid stream of liquid crystal polymer may be employed. The grids have a plurality of converging passages and are preferably arranged so that the liquid crystal polymer passes through progressively smaller holes as it moves downstream. For most purposes, however, a single grid produces sufficient elongation to achieve desirable orientation in the liquid crystal polymer.

The wall of the grid may be lubricated by a stream of inert, low viscosity fluid in order to obtain an almost complete absence of shear flow. However, such lubrication may make the process more complex and difficult to operate. Thus, for most purposes, lubrication is not necessary.

In an unlubricated grid with cone-shaped holes, elongational flow coexists with shear flow and the degree of each type of flow varies depending upon the location in the cone. The maximum of the elongation rate occurs at the exit of the cone along the centerline where shear rate is zero, and the elongation rate becomes zero at the wall where the shear rate is maximum. The quantitative description of the degree of the elongational flow depends upon the rheological properties of the fluid and is not yet established for the liquid crystal polymers. However, if we assume the fluid to be a Newtonian fluid (which is the most simple fluid model), the maximum elongation rate ($\dot{\varepsilon}$ max) can be calculated by $$\dot{\varepsilon}\ max = \frac{24Q}{\pi D^3} \cdot \frac{\tan^3 \alpha \cdot \sin^2 \alpha}{(1 - \cos \alpha)^2 (1 + 2\cos \alpha)} \qquad (2)$$

where Q is the volumetric flow rate per hole, D is the hole exit diameter and $\alpha$ is the half-angle of the cone as discussed by A. E. Everage and R. C. Ballman in *Journal of Applied Polymer Science*, Vol. 18, pages 933-37 (1974). Thus, a high flow rate and a small hole diameter provide a high elongation rate. Although the above expression gives higher elongation rates for larger cone angles, very large angles (e.g., $\alpha > 60°$) are not suitable for practical extrusion because polymer flow can become unstable and secondary vortex flow can form near the wall. The formation of the vortex near the wall depends on the rheological characteristics (particularly elongational flow response) of the fluid. For such a system where the vortex readily forms, holes with the angle which gradually varies from 180° to 0° (i.e., trumpet-shaped holes) are suitable.

Although even small amounts of elongational flow appear to improve the mechanical properties of articles produced from liquid crystal polymers, it is preferred that the elongational flow provided by the present invention have an elongation rate of at least approximately 1.0 second$^{-1}$. The elongational flow preferably has an elongation rate of approximately 100 to 5,000 second$^{-1}$.

After the flow of the fluid stream of the liquid crystal polymer has been converted to a substantially elongational flow (for example, by passing the fluid stream of liquid crystal polymer through a grid having a plurality of converging passages), the fluid stream of liquid crystal polymer is extruded to form a shaped article having the polymer molecules oriented substantially parallel to the flow direction. The orientation of the polymer molecules can be confirmed by determining orientation angle by X-ray analysis.

In the case of a lyotropic liquid crystal polymer, the solvent is removed from the polymer following extrusion. The removal of solvent is commonly accomplished by evaporating the solvent from the extruded article or by extracting the solvent from the extruded article with an aqueous medium, utilizing processes which are well-known in the art.

The conditions of temperature and pressure under which the liquid crystal polymer can be extruded are not critical to the process of the present invention and can easily be determined by one of ordinary skill in the art. Typically, lyotropic polymers are extruded at a temperature within the range of approximately 20° C. to 150° C. and at a pressure within the range of approximately 30 p.s.i. to 400 p.s.i., and thermotropic polymers are extruded at a temperature within the range of approximately 280° C. to 400° C. and at a pressure within the range of approximately 100 p.s.i. to 5,000 p.s.i.

The liquid crystal polymers can be extruded to form a variety of shaped articles. For example, the liquid crystal polymer can be extruded through a die to form a film. It is to be understood that the term "film" as used herein includes any of various thin, flat structures which may be known in the art as sheet, film, etc. The liquid crystal polymer can also be extruded through a spinneret to form a plurality of filaments or can be extrusion molded to form a molded article. The thermotropic liquid crystal polymers are also useful in the extrusion of elongated three-dimensional articles such as rods or pipes.

When the process of the present invention is used in conjunction with the spinning of fibers, the effects of the improved orientation of the polymer molecules in the fibers is demonstrated by a dramatic increase of as much as 50% in take-up speed. Fibers produced from liquid crystal polymer which has been subjected to elongational flow prior to extrusion thus exhibit improved stability under stretching.

The shaped articles which are produced by the process of the present invention exhibit enhanced mechanical properties due to the orientation of the polymer molecules in a direction substantially parallel to the flow direction. Articles having the molecules oriented in such a manner are self-reinforcing, having mechanical properties comparable to those of articles formed from fiber-reinforced isotropic polymeric materials. The manner in which the process of the present invention aids in the orientation of the polymer molecules involves complex theoretical considerations and is incapable of simple explanation. However, it is believed that subjecting the fluid stream of liquid crystal polymer to elongational flow prior to extrusion helps to reduce the polymer domain structure, thereby allowing the polymer molecules to orient more easily during extrusion.

As discussed earlier, liquid crystal polymers have very stiff, rod-like molecules. In the quiescent state, the polymer molecules line up in local regions, thereby forming ordered arrays or domains. The existence of domain texture within the microstructure of a liquid crystal polymer may be confirmed by conventional polarized light techniques whereby a polarizing microscope utilizing crossed-polarizers is employed. The individual domains, however, are not lined up in any particular direction; instead, they exhibit random orientations.

Shear flow alone does not affect the domain structure of liquid crystal polymers. When the applied shear stress is below a critical value (known as "yield stress"), liquid crystal polymers having a domain texture within the microstructure commonly behave like a solid. In most extrusion operations, the shear stress applied to the material is not uniform but varies throughout the material. For example, in the case of extrusion through a duct, the shear stress applied to the material is at a maximum at the wall and is zero in the middle. In such a case, liquid crystal polymer in the middle region where the stress is below the yield stress does not flow like a liquid but travels along like a solid mass thereby forming "plug flow". The plug still consists of randomly ordered arrays. Even where the applied stress is greater than the yield stress, liquid crystal polymer domains may break up into smaller domains, but not to a significant degree.

On the other hand, it appears that elongational flow operates to break up the domains more completely, thereby separating the polymer molecules, which can then be more easily oriented during extrusion.

In any event, it has been observed that subjecting the flow of a fluid stream of liquid crystal polymer to a substantially elongational flow in the substantial absence of shear flow prior to extrusion produces shaped articles having the polymer molecules oriented substantially parallel to the flow direction and exhibiting enhanced mechanical properties.

The mechanical properties of shaped articles produced in accordance with the process of the present invention can be improved still further by subjecting the articles to a heat treatment following extrusion. The articles may be thermally treated in an inert atmosphere (e.g., nitrogen, argon, helium) or alternatively a flowing oxygen-containing atmosphere (e.g., air). For instance, the article may be brought to a temperature approximately 10° C. to 30° C. below the melting temperature of the liquid crystal polymer, at which temperature the article remains a solid object. The heat treatment times commonly range from a few minutes to a number of days, e.g., from 0.5 to 200 hours, or more. Preferably, the heat treatment is conducted for a time of 1 to 48 hours (e.g., approximately 24 to 30 hours). The heat treatment improves the properties of the article by increasing the molecular weight of the liquid crystalline polymer and increasing the degree of crystallinity.

The following Examples are given as specific illustrations of the invention. It should be understood, however, that the invention is not limited to the specific details set forth in the Examples. Reference is made in the Examples to the drawing.

EXAMPLE 1

Films were extruded from a thermotropic liquid crystalline wholly aromatic polyester comprising 75 mole percent of p-oxybenzoyl units and 25 mole percent of 6-oxy-2-naphthoyl units. This polymer exhibited a melting temperature of 295° C. and an inherent viscosity of 7.57 dl./g. when measured in a concentration of 0.1 percent by weight in pentafluorophenol at 60° C.

The polymer was extruded utilizing a conventional film extrusion apparatus with a slit die, as illustrated in the drawing. The unit employed a contact melting method so that melt residence time could be kept short and constant. A compression molded rod (not shown) made from well-dried polymer chips was pressed against a heated surface (not shown). That portion of the rod in contact with the heated surface was melted and introduced to the extrusion apparatus 1 through passage 3, where the fluid stream of wholly aromatic polyester had a flow pattern comprising substantial shear flow. The melt was passed through a filter pack 5 comprising size 80/120 mesh shattered metal sandwiched between two 325 mesh screens 7. In order to induce elongational flow in the substantial absence of shear flow, the melt was passed through a grid 9, measuring approximately 5/16 inch in diameter and containing 43 cone-shaped holes, which was placed after the filter pack and just before the die. The grid was a Baker wet spinning jet spinneret which was adapted for use in the film extrusion apparatus. The holes had an inlet diameter of 814 microns, an exit diameter of 102 microns, and a capillary length of 137 microns. The half-angle of the cone-shaped portion of the holes was 23.3°. At a polymer flow rate of 0.3 g./min., the grid provided an elongation rate of 397 second$^{-1}$ when calculated using Equation (2) above. After being passed through the grid the polymer melt was extruded through a slit die 11. The slit 13 measured 0.007 inches by 0.25 inches and had a length of 0.25 inches. Extruded films were quenched by blowing nitrogen through a quench ring (not shown) located beneath the die.

Mechanical properties of the films produced in accordance with this Example were measured, and the results are listed in Table I.

For purposes of comparison, films were also extruded in the manner described above with the exception that the elongational grid was not used. Mechanical properties of these films were measured and are also listed in Table I.

TABLE I

| EXTRUSION TEMPER-ATURE (°C.) | $N_2$ QUENCH FLOW RATE (ft.$^3$/hr.) | TAKE-UP SPEED (m./min.) | WITH GRID | | | WITHOUT GRID | | |
|---|---|---|---|---|---|---|---|---|
| | | | TENSILE STRENGTH (p.s.i. × 10$^3$) | ELONGA-TION (%) | INITIAL MODULUS (p.s.i. × 10$^6$) | TENSILE STRENGTH (p.s.i. × 10$^3$) | ELONGA-TION (%) | INITAL MODULUS (p.s.i. × 10$^6$) |
| 315 | 11 | 1.5 | 63.3 | 2.29 | 3.41 | 25.0 | 1.82 | 1.59 |

TABLE I-continued

| EXTRUSION TEMPERATURE (°C.) | N₂ QUENCH FLOW RATE (ft.³/hr.) | TAKE-UP SPEED (m./min.) | WITH GRID ||| WITHOUT GRID |||
|---|---|---|---|---|---|---|---|---|
| | | | TENSILE STRENGTH (p.s.i. × 10³) | ELONGATION (%) | INITIAL MODULUS (p.s.i. × 10⁶) | TENSILE STRENGTH (p.s.i. × 10³) | ELONGATION (%) | INITAL MODULUS (p.s.i. × 10⁶) |
| 315 | 11 | 4.0 | 63.4 | 2.16 | 3.61 | 53.6 | 2.01 | 3.24 |
| 330 | 11 | 1.5 | 44.1 | 2.13 | 2.51 | 15.7 | 1.25 | 1.49 |
| 330 | 11 | 4.0 | 27.5 | 1.41 | 2.29 | 12.8 | 1.12 | 1.33 |
| 330 | 24 | 1.5 | 78.2 | 2.61 | 3.68 | 49.4 | 2.12 | 2.75 |

The tensile properties listed in Table I were measured in accordance with standard ASTM Test No. D882. The measurements were made in the machine direction; i.e., parallel to the orientation of the polymer molecules.

The data given in Table I indicate a dramatic improvement in properties of films extruded with the grid as compared to those of films extruded without the grid. This Example thus demonstrates the beneficial effects achieved by subjecting liquid crystal polymer to elongational flow prior to extrusion in accordance with the process of the present invention as compared with conventional extrusion processes wherein the liquid crystal polymer is extruded under conditions of substantial shear flow.

EXAMPLE 2

Films produced in accordance with Example 1 were subjected to a heat treatment in a nitrogen atmosphere at 260° C. for thirty hours. Following heat treatment, the mechanical properties of the films were measured and are listed in Table II.

TABLE II

| EXTRUSION TEMPERATURE (°C.) | N₂ QUENCH FLOW RATE (ft.³/hr.) | TAKE-UP SPEED (m./min.) | WITH GRID ||| WITHOUT GRID |||
|---|---|---|---|---|---|---|---|---|
| | | | TENSILE STRENGTH (p.s.i. × 10³) | ELONGATION (%) | INITIAL MODULUS (p.s.i. × 10⁶) | TENSILE STRENGTH (p.s.i. × 10³) | ELONGATION (%) | INITIAL MODULUS (p.s.i. × 10³) |
| 315 | 11 | 1.5 | 93.2 | 4.06 | 3.05 | 34.2 | 2.50 | 1.64 |
| 315 | 11 | 4.0 | 120.1 | 3.52 | 4.06 | 78.1 | 2.73 | 3.37 |
| 330 | 11 | 1.5 | 68.0 | 3.28 | 2.93 | — | — | — |
| 330 | 11 | 4.0 | 54.4 | 2.00 | 3.14 | 34.5 | 1.87 | 2.11 |

The measurements were made using the same tests as in Example 1. The data demonstrate the increase in properties which is obtained by subjecting the liquid crystal polymer to elongational flow prior to extrusion.

Moreover, the incremental increase of mechanical properties of films which have been heat treated over films which have not been heat treated (as demonstrated by a comparison of Table II with Table I) is greater, in many cases, for films produced with an elongational grid in accordance with the teachings of the instant invention than for films produced under conditions of substantial shear flow.

EXAMPLE 3

The process of Example 1 was repeated, except that the liquid crystal polymer used was a thermotropic wholly aromatic polyester comprising 75 mole percent of p-oxybenzoyl units and 25 mole percent of 6-oxy-2-naphthoyl units and having an inherent viscosity of 8.24 when measured in a concentration of 0.1 percent by weight in pentafluorophenol at 60° C. The mechanical properties of the films produced were measured in accordance with the tests listed in Example 1, and the results are listed in Table III.

TABLE III

| EXTRUSION TEMPERATURE (°C.) | N₂ QUENCH FLOW RATE (ft.³/hr.) | TAKE-UP SPEED (m./min.) | WITH GRID ||| WITHOUT GRID |||
|---|---|---|---|---|---|---|---|---|
| | | | TENSILE STRENGTH (p.s.i. × 10³) | ELONGATION (%) | INITIAL MODULUS (p.s.i. × 10⁶) | TENSILE STRENGTH (p.s.i. × 10³) | ELONGATION (%) | INITIAL MODULUS (p.s.i. × 10⁶) |
| 320 | 11 | 3.5 | 58.4 | 2.20 | 3.31 | 39.9 | 1.74 | 2.72 |
| 335 | 11 | 3.5 | 43.7 | 1.73 | 2.94 | 17.5 | 1.34 | 1.56 |

Again, the data indicate a dramatic increase in properties of films produced in accordance with the process of the present invention over films produced conventionally.

EXAMPLE 4

Films produced in accordance with the process of Example 3 were subjected to the heat treatment process described in Example 2. The mechanical properties of the films produced with and without the elongational grid were measured in accordance with the tests listed in Example 1 and the results are given in Table IV.

TABLE IV

| EXTRUSION TEMPERATURE (°C.) | N₂ QUENCH FLOW RATE (ft.³/hr.) | TAKE-UP SPEED (m./min.) | WITH GRID ||| WITHOUT GRID |||
|---|---|---|---|---|---|---|---|---|
| | | | TENSILE STRENGTH (p.s.i. × 10³) | ELONGATION (%) | INITIAL MODULUS (p.s.i. × 10⁶) | TENSILE STRENGTH (p.s.i × 10³) | ELONGATION (%) | INITIAL MODULUS (p.s.i. × 10⁶) |
| 320 | 11 | 3.5 | 84.7 | 2.92 | 3.63 | 68.3 | 2.26 | 3.50 |
| 335 | 11 | 3.5 | 96.1 | 2.87 | 4.08 | 30.6 | 1.64 | 1.98 |

The data again demonstrate the improved properties which are obtained when films are formed from liquid crystal polymer which has been subjected to elongational flow prior to extrusion.

EXAMPLE 5

The films were extruded according to the process of Example 1, except that the liquid crystal polymer used was a thermotropic wholly aromatic polyester comprising 40 mole percent of p-oxybenzoyl units, 15 mole percent of 1,2-ethylenedioxy-4,4'-dibenzoyl units, 15 mole percent of terephthaloyl units, and 30 mole percent of methyl substituted 1,4-dioxyphenylene units. This polymer exhibited an inherent viscosity of 2.4 dl./g. when measured in a concentration of 0.3 weight-/volume percent in pentafluorophenol at 60° C.

Mechanical properties of films produced with and without the elongational grid were measured in accordance with the tests listed in Example 1, and the results are listed in Table V.

TABLE V

| EXTRUSION TEMPERATURE (°C.) | $N_2$ QUENCH FLOW RATE (ft.$^3$/hr.) | TAKE-UP SPEED (m./min.) | WITH GRID | | | WITHOUT GRID | | |
|---|---|---|---|---|---|---|---|---|
| | | | TENSILE STRENGTH (p.s.i. × 10$^3$) | ELONGATION (%) | INITIAL MODULUS (p.s.i. × 10$^6$) | TENSILE STRENGTH (p.s.i. × 10$^3$) | ELONGATION (%) | INITIAL MODULUS (p.s.i. × 10$^6$) |
| 310 | 22 | 1.5 | 70.3 | 3.30 | 3.44 | 65.8 | 3.28 | 3.23 |
| 310 | 22 | 3.25 | 69.4 | 2.56 | 3.95 | 63.9 | 2.48 | 3.71 |
| 325 | 22 | 1.5 | 64.1 | 3.19 | 3.23 | 45.7 | 2.49 | 2.79 |
| 325 | 22 | 3.25 | 62.4 | 2.31 | 3.70 | 49.7 | 2.00 | 3.46 |
| 340 | 22 | 1.5 | 37.6 | 2.04 | 2.77 | 32.8 | 1.91 | 2.16 |
| 340 | 22 | 6.25 | 48.0 | 1.64 | 3.81 | 35.6 | 1.60 | 2.42 |

The data demonstrate an improvement in mechanical properties of films produced in accordance with the present invention over conventional films produced under conditions of substantial shear flow.

EXAMPLE 6

The films produced in accordance with Example 5 were subjected to a heat treatment at 250° C. for 24 hours in a nitrogen atmosphere. The mechanical properties of the heat treated films were measured in accordance with the tests listed in Example 1. The results of these measurements are listed in Table VI.

TABLE VI

| EXTRUSION TEMPERATURE (°C.) | $N_2$ QUENCH FLOW RATE (ft.$^3$/hr.) | TAKE-UP SPEED (m./min.) | WITH GRID | | | WITHOUT GRID | | |
|---|---|---|---|---|---|---|---|---|
| | | | TENSILE STRENGTH (p.s.i. × 10$^3$) | ELONGATION (%) | INITIAL MODULUS (p.s.i. × 10$^6$) | TENSILE STRENGTH (p.s.i. × 10$^3$) | ELONGATION (%) | INITIAL MODULUS (p.s.i. × 10$^6$) |
| 310 | 22 | 1.5 | 106.3 | 4.16 | 3.28 | 95.8 | 4.01 | 2.99 |
| 310 | 22 | 3.25 | 94.3 | 3.61 | 3.23 | 93.0 | 3.43 | 3.24 |
| 325 | 22 | 1.5 | 99.4 | 4.13 | 2.94 | 67.4 | 3.22 | 2.62 |
| 325 | 22 | 3.25 | 81.1 | 3.36 | 2.94 | 66.5 | 2.83 | 2.80 |
| 340 | 22 | 1.5 | 58.4 | 3.14 | 2.55 | 50.9 | 2.81 | 2.24 |
| 340 | 22 | 6.25 | 53.8 | 2.38 | 2.38 | 44.7 | 2.29 | 1.97 |

Again, the data indicate that heat treated films produced from a liquid crystal polymer which has been subjected to elongational flow prior to extrusion exhibit improved properties.

Although the invention has been described with preferred embodiments, it is to be understood that variations and modifications may be employed as will be apparent to those skilled in the art. Such variations and modifications are to be considered within the scope of the claims appended hereto.

I claim:

1. An improved process for extruding liquid crystal polymer to form shaped articles comprising the steps of:
    (a) providing a fluid stream of liquid crystal polymer wherein said stream has a flow pattern comprising substantial shear flow;
    (b) converting the flow of said fluid stream of liquid crystal polymer to a substantially elongational flow in the substantial absence of shear flow; and
    (c) extruding said fluid stream of liquid crystal polymer to form a shaped article having the polymer molecules oriented substantially parallel to the flow direction and exhibiting enhanced mechanical properties.

2. The process of claim 1 wherein said substantially elongational flow of step (b) has an elongation rate of at least approximately 1.0 second $^{-1}$.

3. The process of claim 2 wherein said substantially elongational flow of step (b) has an elongation rate of approximately 100 to 5,000 second $^{-1}$.

4. The process of claim 1 wherein the flow of said fluid stream of liquid crystal polymer is converted to said substantially elongational flow by converging and drawing said fluid stream of liquid crystal polymer.

5. The process of claim 4 wherein the flow of said fluid stream of liquid crystal polymer is converted to said substantially elongational flow by passing said fluid stream of liquid crystal polymer through at least one grid having a plurality of converging passages.

6. The process of claim 5 wherein the flow of said fluid stream of liquid crystal polymer is converted to said substantially elongational flow by passing said fluid stream of liquid crystal polymer through a plurality of grids disposed in series in the flowpath of said fluid stream of liquid crystal polymer, said grids having a plurality of converging passages.

7. The process of claims 5 or 6 wherein said converging passages have an exit diameter of approximately 20 to 1,000 microns.

8. The process of claim 7 wherein said converging passages have an exit diameter of approximately 75 to 150 microns.

9. The process of claim 8 wherein said converging passages have an exit diameter of approximately 100 microns.

10. The process of claims 5 or 6 wherein said converging passages are cone-shaped holes.

11. The process of claims 5 or 6 wherein said converging passages are trumpet-shaped holes.

12. The process of claim 1 wherein said fluid stream of liquid crystal polymer comprises a molten stream of melt processable polymer exhibiting an anisotropic melt phase.

13. The process of claim 12 wherein said melt processable polymer is selected from the group consisting of wholly aromatic polyesters, aromatic-aliphatic polyesters, aromatic polyazomethines, and aromatic polyester-carbonates.

14. The process of claim 13 wherein said melt processable polymer comprises wholly aromatic polyester.

15. The process of claim 1 wherein said fluid stream of liquid crystal polymer comprises a lyotropic liquid crystal polymer in a compatible solvent.

16. The process of claim 15 wherein said lyotropic liquid crystal polymer comprises a polymer selected from the group consisting of wholly aromatic polyamides, aromatic-aliphatic polyamides, aromatic polyamide-hydrazides, polybenzobisoxazoles, and polybenzobisthiazoles.

17. The process of claim 1 wherein said fluid stream of liquid crystal polymer is extruded through a die to form a film.

18. The process of claim 1 wherein said fluid stream of liquid crystal polymer is extruded through a die to form an elongated three-dimensional article.

19. The process of claim 1 wherein said fluid stream of liquid crystal polymer is extruded through a spinneret to form a plurality of filaments.

20. The process of claim 1 wherein said fluid stream of liquid crystal polymer is extrusion molded to form a molded article.

21. An improved process for extruding liquid crystal polymer to form shaped articles comprising the steps of:
(a) providing a fluid stream of liquid crystal polymer wherein said stream has a flow pattern comprising substantial shear flow;
(b) converting the flow of said liquid crystal polymer to a substantially elongational flow in the substantial absence of shear flow by passing said fluid stream of liquid crystal polymer through at least one grid having a plurality of converging passages, wherein said converging passages have an exit diameter of approximately 20 to 1,000 microns and wherein said substantially elongational flow has an elongation rate of at least approximately 1.0 second$^{-1}$; and
(c) extruding said liquid crystal polymer to form a shaped article having the polymer molecules oriented substantially parallel to the flow direction and exhibiting enhanced mechanical properties.

22. The process of claim 21 wherein said substantially elongational flow of step (b) has an elongation rate of approximately 100 to 5,000 second$^{-1}$.

23. The process of claim 21 wherein the flow of said fluid stream of liquid crystal polymer is converted to said substantially elongational flow by passing said fluid stream of liquid crystal polymer through a plurality of grids disposed in series in the flowpath of said fluid stream of liquid crystal polymer, said grids having a plurality of converging passages.

24. The process of claims 21 or 23 wherein said converging passages have an exit diameter of approximately 75 to 150 microns.

25. The process of claim 24 wherein said converging passages have an exit diameter of approximately 100 microns.

26. The process of claims 21 or 23 wherein said converging passages are cone-shaped holes.

27. The process of claims 21 or 23 wherein said converging passages are trumpet-shaped holes.

28. The process of claim 21 wherein said fluid stream of liquid crystal polymer comprises a molten stream of melt processable polymer exhibiting an anisotropic melt phase.

29. The process of claim 28 wherein said melt processable polymer is selected from the group consisting of wholly aromatic polyesters, aromatic-aliphatic polyesters, aromatic polyazomethines, and aromatic polyester-carbonates.

30. The process of claim 29 wherein said melt processable polymer comprises wholly aromatic polyester.

31. The process of claim 30 wherein said polyester comprises a melt processable wholly aromatic polyester capable of forming an anisotropic melt phase at a temperature below approximately 350° C. consisting essentially of the recurring moieties I and II wherein:

I is 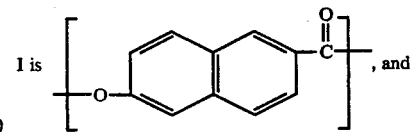, and

II is 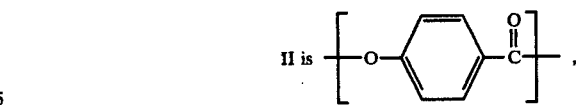.

wherein said polyester comprises approximately 10 to 90 mole percent of moiety I, and approximately 10 to 90 mole percent of moiety II.

32. The process of claim 30 wherein said polyester comprises a melt processable wholly aromatic polyester capable of forming an anisotropic melt phase at a temperature below approximately 325° C. consisting essentially of the recurring moieties I, II, and III wherein:

I is 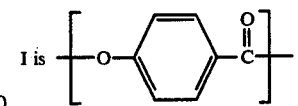,

II is 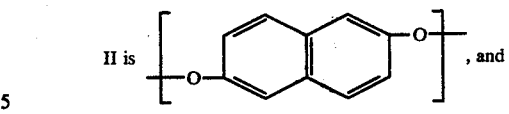, and

III is 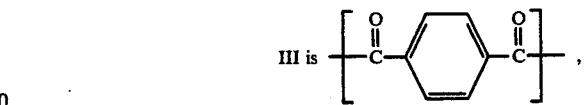, wherein said polyester comprises approximately 30 to 70 mole percent of moiety I.

33. The process of claim 30 wherein said polyester comprises a melt processable polyester capable of forming an anisotropic melt phase at a temperature no higher than approximately 320° C. consisting essentially of the recurring moieties I, II, III, and IV wherein:

I is 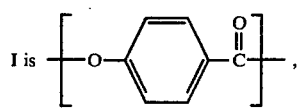,

II is 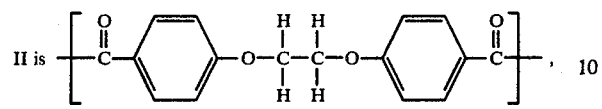,

III is 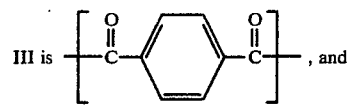, and

IV is 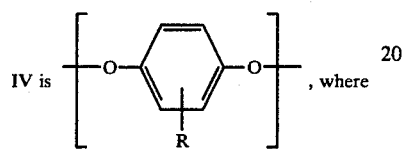, where

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV.

34. The process of claim 21 wherein said fluid stream of liquid crystal polymer comprises a lyotropic liquid crystal polymer in a compatible solvent.

35. The process of claim 34 wherein said lyotropic liquid crystal polymer comprises a polymer selected from the group consisting of wholly aromatic polyamides, aromatic-aliphatic polyamides, aromatic polyamide-hydrazides, polybenzobisoxazoles, and polybenzobisthiazoles.

36. The process of claim 21 wherein said fluid stream of liquid crystal polymer is extruded through a die to form a film.

37. The process of claim 21 wherein said fluid stream of liquid crystal polymer is extruded through a die to form an elongated three-dimensional article.

38. The process of claim 21 wherein said fluid stream of liquid crystal polymer is extruded through a spinneret to form a plurality of filaments.

39. The process of claim 21 wherein said fluid stream of liquid crystal polymer is extrusion molded to form a molded article.

40. An improved process for extruding melt processable wholly aromatic polyester to form shaped articles, said polyester comprising a melt processable wholly aromatic polyester selected from the group consisting of:

(i) a melt processable wholly aromatic polyester capable of forming an anisotropic melt phase at a temperature below approximately 350° C. consisting essentially of the recurring moieties I and II wherein:

I is 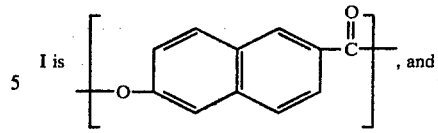, and

II is 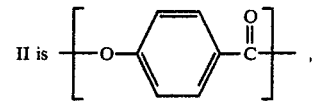, wherein said polyester comprises approximately 10 to 90 mole percent of moiety I, and approximately 10 to 90 mole percent of moiety II, (ii) a melt processable wholly aromatic polyester capable of forming an anisotropic melt phase at a temperature below approximately 325° C. consisting essentially of the recurring moieties I, II, and III wherein:

I is 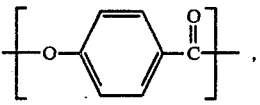,

II is 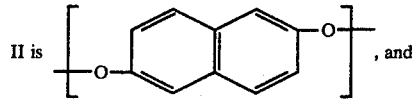, and

III is 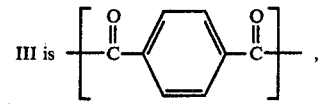, wherein said polyester comprises approximately 30 to 70 mole percent of moiety I, and (iii) a melt processable wholly aromatic polyester capable of forming an anisotropic melt phase at a temperature no higher than approximately 320° C. consisting essentially of the recurring moieties I, II, III, and IV wherein:

I is 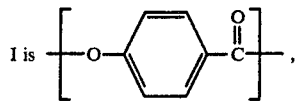,

II is 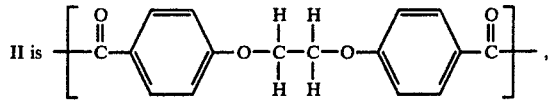,

III is 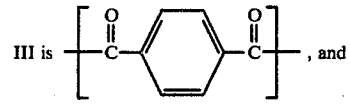, and

IV is 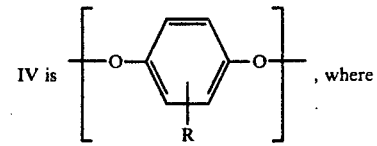, where

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV, said process comprising the steps of:

(a) providing a fluid stream of said wholly aromatic polyester wherein said stream has a flow pattern comprising substantial shear flow;

(b) converting the flow of said wholly aromatic polyester to a substantially elongational flow in the substantial absence of shear flow by passing said fluid stream of said wholly aromatic polyester through at least one grid having a plurality of converging passages, wherein said converging passages have an exit diameter of approximately 20 to 1,000 microns and wherein said substantially elongational flow has an elongation rate of at least approximately 1.0 second$^{-1}$; and (c) extruding said wholly aromatic polyester to form a shaped article having the polymer molecules oriented substantially parallel to the flow direction and exhibiting enhanced mechanical properties.

41. The process of claim 40 wherein said substantially elongational flow of step (b) has an elongation rate of approximately 100 to 5,000 second$^{-1}$.

42. The process of claim 40 wherein said converging passages have an exit diameter of approximately 75 to 150 microns.

43. The process of claim 42 wherein said converging passages have an exit diameter of approximately 100 microns.

44. The process of claim 40 wherein said converging passages are cone-shaped holes.

45. The process of claim 40 wherein said converging passages are trumpet-shaped holes.

46. In a process for extruding liquid crystal polymer to form shaped articles wherein a fluid stream of said liquid crystal polymer having a flow pattern comprising substantial shear flow is provided, the improvement comprising:

(a) converting the flow of said liquid crystal polymer to a substantially elongational flow in the substantial absence of shear flow by passing said fluid stream of said liquid crystal polymer through at least one grid having a plurality of converging holes having an exit diameter of a size sufficient to convert the flow of said liquid crystal polymer to said substantially elongational flow, and (b) extruding said fluid stream of liquid crystal polymer to form a shaped article exhibiting enhanced mechanical properties wherein the polymer molecules are oriented substantially parallel to the flow direction.

47. The process of claim 46 wherein said substantially elongational flow has an elongation rate of at least approximately 1.0 second$^{-1}$.

48. The process of claim 46 wherein the flow of said fluid stream of liquid crystal polymer is converted to said substantially elongational flow by passing said fluid stream of liquid crystal polymer through a plurality of grids disposed in series in the flowpath of said fluid stream of liquid crystal polymer, said grids having a plurality of converging passages.

49. The process of claims 46 or 48 wherein said converging passages have an exit diameter of approximately 100 microns.

50. The process of claims 46 or 48 wherein said converging passages are cone-shaped holes.

51. The process of claims 46 or 48 wherein said converging passages are trumpet-shaped holes.

52. The process of claim 46 wherein said fluid stream of liquid crystal polymer comprises a molten stream of melt processable polymer exhibiting an anisotropic melt phase.

53. The process of claim 52 wherein said melt processable polymer is selected from the group consisting of wholly aromatic polyesters, aromatic-aliphatic polyesters, aromatic polyazomethines, and aromatic polyester-carbonates.

54. The process of claim 53 wherein said melt processable polymer comprises wholly aromatic polyester.

55. The process of claim 54 wherein said polyester comprises a melt processable wholly aromatic polyester capable of forming an anisotropic melt phase at a temperature below approximately 350° C. consisting essentially of the recurring moieties I and II wherein:

I is 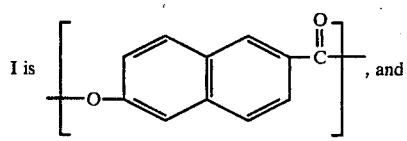, and

II is 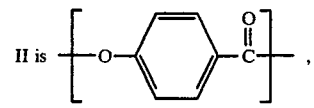, wherein said polyester comprises approximately 10 to 90 mole percent of moiety I, and approximately 10 to 90 mole percent of moiety II.

56. The process of claim 54 wherein said polyester comprises a melt processable wholly aromatic polyester capable of forming an anisotropic melt phase at a temperature below approximately 325° C. consisting essentially of the recurring moieties I, II, and III wherein:

I is 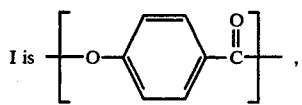,

II is 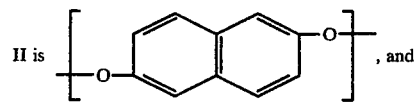, and

III is 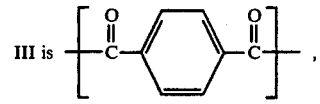, wherein said polyester comprises approximately 30 to 70 mole percent of moiety I.

57. The process of claim 54 wherein said polyester comprises a melt processable polyester capable of forming an anisotropic melt phase at a temperature no higher than approximately 320° C. consisting essentially of the recurring moieties I, II, III, and IV wherein:

I is 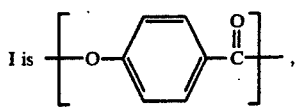,

II is 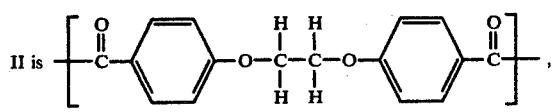,

III is 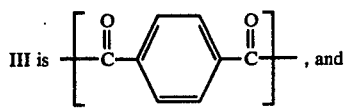, and

IV is 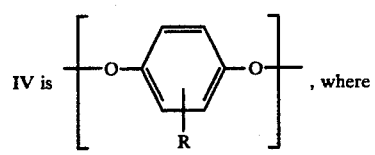, where

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV.

58. The process of claim 46 wherein said fluid stream of liquid crystal polymer comprises a lyotropic liquid crystal polymer in a compatible solvent.

59. The process of claim 58 wherein said lyotropic liquid crystal polymer comprises a polymer selected from the group consisting of wholly aromatic polyamides, aromatic-aliphatic polyamides, aromatic polyamide-hydrazides, polybenzobisoxazoles, and polybenzobisthiazoles.

60. The process of claim 46 wherein said fluid stream of liquid crystal polymer is extruded through a die to form a film.

61. The process of claim 46 wherein said fluid stream of liquid crystal polymer is extruded through a die to form an elongated three-dimensional article.

62. The process of claim 46 wherein said fluid stream of liquid crystal polymer is extruded through a spinneret to form a plurality of filaments.

63. The process of claim 46 wherein said fluid stream of liquid crystal polymer is extrusion molded to form a molded article.

* * * * *